United States Patent
Lewis et al.

(10) Patent No.: US 9,367,440 B2
(45) Date of Patent: Jun. 14, 2016

(54) MEMORY DEVICE

(71) Applicants: Matthew Lewis, Reutlingen (DE); Paulius Duplys, Markgroeningen (DE)

(72) Inventors: Matthew Lewis, Reutlingen (DE); Paulius Duplys, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 14/270,576

(22) Filed: May 6, 2014

(65) Prior Publication Data

US 2014/0337586 A1 Nov. 13, 2014

(30) Foreign Application Priority Data

May 8, 2013 (DE) .................. 10 2013 208 530

(51) Int. Cl.
*G06F 12/02* (2006.01)
*G06F 21/79* (2013.01)

(52) U.S. Cl.
CPC ............ *G06F 12/0223* (2013.01); *G06F 21/79* (2013.01)

(58) Field of Classification Search
CPC ..... G06F 3/067; G06F 3/0605; G06F 3/0659; G06F 3/0613; G06F 3/0689; G06F 12/06; G06F 15/40; G06F 11/00; G06F 3/14; G11C 8/00
See application file for complete search history.

(56) References Cited

U.S. PATENT DOCUMENTS

| | | | | | |
|---|---|---|---|---|---|
| 3,701,972 | A * | 10/1972 | Berkeley | ............. | G06F 17/2205 709/248 |
| 3,815,122 | A * | 6/1974 | Schwartz | ............. | H04L 25/4904 341/74 |
| 4,058,711 | A * | 11/1977 | Ondercin | ............. | G05B 19/052 700/37 |
| 4,542,354 | A * | 9/1985 | Robinton | ............. | G01R 21/133 330/9 |
| 5,428,598 | A * | 6/1995 | Veldhuis | ................. | G06F 21/10 360/27 |
| 5,953,352 | A * | 9/1999 | Meyer | ................. | G06F 11/1612 714/56 |
| 6,061,822 | A * | 5/2000 | Meyer | ................. | G06F 11/1612 711/112 |
| 6,208,478 | B1 * | 3/2001 | Chiu | .................. | G11B 20/1403 360/46 |
| 6,803,799 | B1 * | 10/2004 | Churchill | ............... | H03K 3/012 327/202 |
| 6,898,101 | B1 * | 5/2005 | Mann | .................... | G06F 15/7867 365/51 |
| 2001/0003837 | A1 * | 6/2001 | Norman | ............. | G06F 13/1694 711/5 |
| 2002/0175705 | A1 * | 11/2002 | Lowy | .................... | H03K 3/0375 326/46 |
| 2004/0160852 | A1 * | 8/2004 | Sasagawa | ................. | G11C 7/22 365/233.1 |
| 2009/0172304 | A1 * | 7/2009 | Gueron | ............... | G06F 12/0802 711/154 |
| 2009/0193213 | A1 * | 7/2009 | Winter | .................... | H03M 7/30 711/165 |
| 2010/0020624 | A1 * | 1/2010 | Mayor | .................... | G11C 7/065 365/189.15 |
| 2010/0095133 | A1 * | 4/2010 | Peter | ........................ | G06F 7/00 713/189 |

* cited by examiner

*Primary Examiner* — Jared Rutz
*Assistant Examiner* — Jean Edouard
(74) *Attorney, Agent, or Firm* — Norton Rose Fulbright US LLP

(57) ABSTRACT

A memory device having a primary memory element, in which the memory device includes an evaluation device to ascertain whether the primary memory element experiences a state change and to activate a secondary memory element so that if (a) the primary memory element experiences a state change, the secondary memory element does not carry out a state change, and if (b) the primary memory element does not experience a state change, the secondary memory element carries out a state change.

12 Claims, 3 Drawing Sheets

MEMORY DEVICE

RELATED APPLICATION INFORMATION

The present application claims priority to and the benefit of German patent application no. 10 2013 208 530.3, which was filed in Germany on May 8, 2013, the disclosure of which is incorporated herein by reference.

FIELD OF THE INVENTION

The present invention relates to a memory device according to the definition of the species in claim 1, as well as a method and a computer program according to the other independent patent claims.

BACKGROUND INFORMATION

Digital electronic circuits are known from the market, in particular digital integrated circuits, which result in a change of an operating current which is impulse-like in most cases in the case of internal switching operations of memory elements, e.g., of bistable multivibrators, so-called flip-flops. These changes in the operating current may be measured outside of the integrated circuit, thus making it possible to infer a particular data content of the memory elements with the aid of methods and algorithms which are already known. This is generally not desirable.

SUMMARY OF THE INVENTION

An object underlying the present invention may be achieved by a memory device according to the description herein as well as a method and a computer program according to the further descriptions herein. Advantageous refinements are specified in the further descriptions herein. Features which are important for the present invention are furthermore specified in the following description and in the drawings; the features may be important for the present invention both alone and in different combinations without explicit reference being made thereto again.

The present invention relates to a memory device having a primary memory element. According to the present invention, the memory device includes an evaluation device which is configured to ascertain whether or not the primary memory element experiences a state change and to activate a secondary memory element in such a way that if
  a) the primary memory element experiences a state change, the secondary memory element does not carry out a state change, and if
  b) the primary memory element does not experience a state change, the secondary memory element carries out a state change.

The memory device is an electronic circuit for storing digital data permanently and/or temporarily. With the aid of the present invention, it is advantageously achieved that the memory device experiences or carries out exactly one state change overall, which may be periodically over time. For example, the primary memory element is a flip-flop (bistable multivibrator) which is activated at its data input by an output of a logic gate connected upstream therefrom or of another flip-flop connected upstream therefrom. The primary memory element experiences or does not experience a state change on a case-by-case basis as a function of the activation. According to the present invention, the secondary memory element behaves "complementary" thereto, so to speak. In this case, it is essentially not important in which direction the state of the secondary memory element changes with respect to a direction of a state change, which did not take place, of the primary memory element. The present invention advantageously uses the knowledge that an increase, which is caused by the particular state change and is generally short-term, in an operating current feeding the memory device is essentially independent of the direction of the state change. With the aid of the present invention, the ascertainment of the particular state of the primary memory element with the aid of an analysis of the operating current or with the aid of a measurement of the electrical and/or magnetic fields in a spatial environment of the memory device is made more difficult or even virtually impossible.

For this purpose, the present invention advantageously uses a "deterministic" method, i.e., random signals or pseudo random signals and the physical elements necessary thereto are not necessary to carry out the present invention. As a result, issues with "real" random signals may be prevented in the presence of potential external electrical or magnetic interference fields. Furthermore, the present invention only requires an addition to a particular circuit architecture, standard cells, e.g., in client-specific integrated circuits, which may be being used. A modification of the cells themselves, i.e., for example, relating to the physical implementation of transistors or gates in a semiconductor substrate, is not necessary. Thus, costs and risks may be kept at a minimum. Furthermore, the addition according to the present invention to an existing digital memory device requires comparably little additional space on the semiconductor substrate ("chip") and is accordingly cost-effective. Only those memory devices, i.e., concrete flip-flops and/or registers constructed therefrom which are to be protected against unauthorized reading out of data to be processed, are added ("mirrored") according to the present invention. For example, an 8-bit register to be protected in a cryptographic device essentially requires only the addition of another 8-bit register for the "mirroring process." Even if a 128-bit register is to be protected in its entirety, the process only requires approximately 1000 additional gate equivalents according to a rough computation, which is fairly little compared to other methods. Furthermore, the memory device according to the present invention is scalable sufficiently well, i.e., it is easily expandable to almost any size since a particular circuit must only be changed or added to on the level of flip-flops and gates. Generally, it may be sufficient to only protect according to the present invention a comparably small area of a circuit. In this way, additional utilization of electrical power may also be kept small.

In one specific embodiment, the secondary memory element is an integral part of the memory device. Alternatively, the secondary memory element may, however, also be situated or implemented separately from the memory device or the primary memory element.

In one embodiment of the memory device according to the present invention, the evaluation device has a comparator, an input and an associated output of the primary memory element being connected to the comparator and an output of the comparator being connected to an input of the secondary memory element. Here, the comparator may be configured to control the secondary memory element in such a way that the secondary memory element,
  a) changes a bit value at its output if the comparator recognizes a parity of the bit values at the input and at the output of the primary memory element, and
  b) does not change the bit value at its output if the comparator recognizes a disparity of the bit values at the input and at the output of the primary memory element.

Since the instantaneous state of the primary memory element is present at its output, and, at the same time, the subsequent state is detectable at its input, the comparator is able to anticipate, so to speak, whether or not a state change will take place in the next (clock) step. For this to happen, it is generally sufficient that the evaluation device only includes the comparator which may be implemented with the aid of logic gates. The above-described structure of the memory device allows for a particularly simple implementation of the principle according to the present invention. In this way, only comparably little additional installation space or area is necessary for the memory device, on the one hand, and, on the other hand, little additional current is required from the operating voltage, whereby other "potential attacks" with respect to the state of the primary memory element are reduced or prevented.

In another embodiment of the memory device, the primary and the secondary memory elements are edge-clocked registers. In this way, the possible applications of the memory device according to the present invention are advantageously expanded, since a plurality of digital circuits is also controlled as a function of the edges of a clock signal.

It may, in particular, be provided that the primary and the secondary memory elements are configured to change a bit value at their outputs at least approximately at the same time. The phrase "at the same time" is to be understood with reference to time, e.g., with reference to the edges of a clock signal. This makes it possible for the alternative state changes according to the present invention of the primary and the secondary memory elements to take place essentially periodically in the same time raster. According to the present invention, the primary memory element and the secondary memory element, however, do not change the bit values at their outputs at the same time in the same clock step. In this way, the possibility of ascertaining the state of the primary memory element by measuring the operating current or the like is made a lot more difficult or even impossible.

In another embodiment of the memory device according to the present invention, the primary memory element includes at least one D flip-flop and the secondary memory element includes at least one T flip-flop. Here, the indications "D" and "T" refer to the terms "delay" and "toggle," respectively. For example, the D flip-flop and the T flip-flop functionally correspond to the known discrete flip-flop types "7474" and "74112," respectively. The T flip-flop may be configured as a so-called "JK flip-flop." D flip-flops are used in a plurality of digital circuits, and T flip-flops are elements which are particularly suitable for the purpose according to the present invention.

In another embodiment, the primary memory element includes at least one D flip-flop and the secondary memory element also includes at least one D flip-flop. Here, the D flip-flop of the secondary memory element is, for example, functionally added to a T flip-flop with the aid of logic gates. In this way, only one flip-flop type is advantageously necessary for the memory device according to the present invention, whereby costs and effort may potentially be saved.

The present invention is particularly effective if the output of the secondary memory element is acted on by a capacitive load, so that the entire capacitive load at the output of the secondary memory element is at least approximately comparable to the entire capacitive load at the corresponding output of the primary memory element. In particular, in the case of frequently used so-called CMOS (complementary metal oxide semiconductor) circuits, the temporary increase in the operating current during the state change of a flip-flop depends approximately proportionally on a connected capacitive load. This load includes for the first part parasitic capacities in the flip-flop itself, and for the second part, it includes parasitic capacities of lines which lead from an output of the flip-flop to other flip-flop and/or to logic gates, as well as input capacities of these flip-flops and/or logic gates. Therefore, an (additional) capacitive load may be advantageously connected to the secondary memory element. In this way, at least approximately identical changes of the operating current of the memory device are made possible, in particular independently of whether the primary memory element or the secondary memory element is experiencing or carrying out a state change in a particular (clock) step. The result is an improved effect of the present invention.

In one embodiment of the present invention, the primary memory element, the evaluation device, and the secondary memory element are implemented in one joint integrated circuit, in particular with the aid of CMOS cells or as an ASIC, or as an FPGA. For example, the CMOS cells are implemented as standard cells, whereby a particularly advantageous reproducibility of the memory device results. A similar result is obtained for ASICs (application-specific integrated circuits) or for FPGA (field-programmable gate array) circuits. For these specific embodiments of integrated circuits, the present invention is advantageously applicable, since, due to the comparably high packing density, an "attack" for ascertaining the state of the primary memory element might be attempted in particular via a measurement of the operating current. This may, in particular, be made more difficult or even prevented with the aid of the present invention.

Furthermore, it may be provided that the comparator includes at least one exclusive OR gate. Generally, except for the exclusive OR gate no other logic gates are necessary for the comparator or for the evaluation device. In this way, the memory device according to the present invention may be advantageously implemented simply and cost-effectively.

Furthermore, the present invention may be advantageously applied to a memory register which includes at least two memory devices, as described above in multiple embodiments. In this way, the present invention may advantageously be applied not only to single flip-flops, but also to almost any specific embodiment of digital memory devices, e.g., to parallel or serial shift registers, as well as to state machines and the like. It is understood that the present invention may also be applied to multiple, or even all, memory registers which are situated in one joint integrated circuit. The present invention is therefore virtually arbitrarily expandable.

Furthermore, the present invention relates to a method for operating the memory device including a primary memory element and a secondary memory element, it being ascertained with the aid of an evaluation device whether or not the primary memory element experiences a state change, and the secondary memory element being activated by the evaluation device in such a way that if a) the primary memory element experiences a state change, the secondary memory element does not carry out a state change, and if b) the primary memory element does not experience a state change, the secondary memory element carries out a state change. For the method according to the present invention, analogously comparable advantages result as has already been described above in conjunction with the memory device according to the present invention.

In particular, the method may be used to make it more difficult for side channel attacks against a cryptographic device which includes at least one memory device according to the present invention. Here, the cryptographic device may include single flip-flops and/or almost any other type of digital memory devices, e.g., parallel or serial shift registers and the like.

Furthermore, the present invention includes a computer program product having a computer program for changing and/or adding a netlist and/or a source code for describing at least one memory device having a primary memory element. According to the present invention, the computer program is configured to add in the netlist or the source code an associated evaluation device and an associated secondary memory to the particular primary memory element. For example, a VHDL (very high definition language) source code which describes a cryptographic device may be changed or added to with the aid of the computer program according to the present invention. In this case, existing primary memory elements may be identified and added, in a describing manner, the associated evaluation device according to the present invention (or the comparator) and the associated secondary memory element. Likewise, it is possible to only add a predefinable part of the primary memory elements in a describing manner according to the present invention. Subsequently, the VHDL source code may be further processed in a manner known per se in order to define a particular integrated circuit and thus to ultimately produce same. The computer program is therefore one possible specific embodiment for a method for adding particular associated evaluation devices and secondary memory elements to one or multiple primary memory elements existing in a describing manner.

Exemplary specific embodiments of the present invention are explained below with reference to the drawings.

The same reference numerals are used for functionally equivalent elements and variables in all figures, even in different specific embodiments.

DETAILED DESCRIPTION

Figure 1:
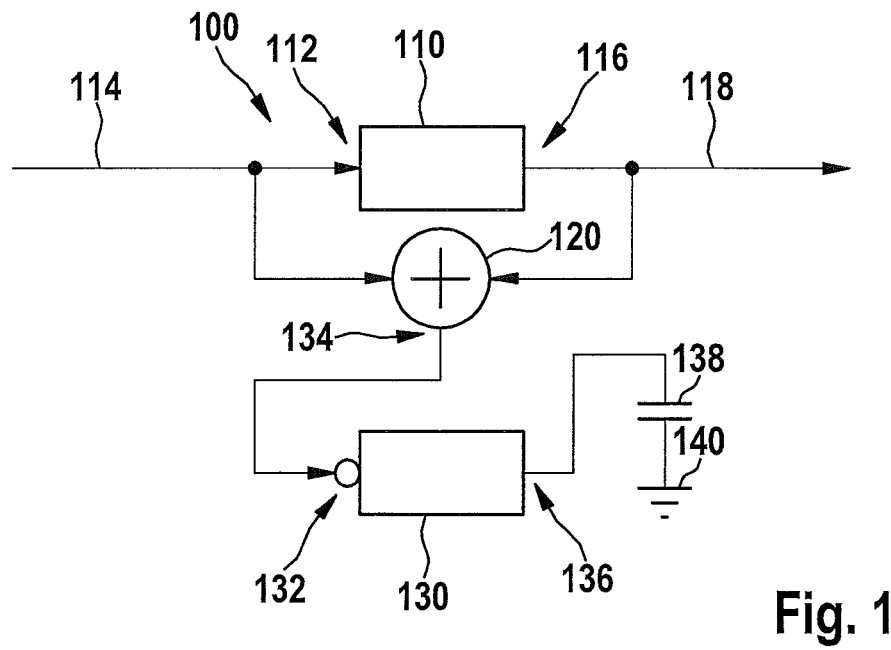
FIG. 1 shows a block diagram for a memory device having a primary memory element, a secondary memory element, and a comparator.

FIG. 1 shows a block diagram for a memory device 100 for at least temporarily storing or buffering digital data. In the present case, memory device 100 is configured to store one bit in each case. For this purpose, memory device 100 includes in an upper area of FIG. 1 a primary memory element 110 with the aid of which digital data may be read-in, stored and output (from left to right in the drawing). For this purpose, primary memory element 110 includes an input 112 at which a first data line 114 is connected and an output 116 at which a second data line 118 is connected.

In a central area of FIG. 1, memory device 100 has an evaluation device 120. Evaluation device 120 includes two inputs (without reference numerals), each of which is connected to input 112 and output 116 of primary memory element 110.

In a lower area of FIG. 1, memory device 100 has a secondary memory element 130. In the present case, secondary memory element 130 has an inverting input 132 which is connected to an output 134 of evaluation device 120. In the present case, an output 136 of secondary memory element 130 is connected to a first terminal of a capacitor 138 which is connected to a ground potential 140 at its second terminal.

In the specific embodiment of memory device 100 from FIG. 1, primary memory element 110 is, for example, implemented as a so-called D flip-flop ("D" standing for "delay") and secondary memory element 130 is, for example, implemented as a so-called T flip-flip ("T" standing for "toggle"). A (which may be joint) clock for switching primary memory element 110 and secondary memory element 130 is not illustrated in FIG. 1.

Alternatively, it is possible that primary memory element 110 and secondary memory element 130 are implemented using non-clocked multivibrators. For example, primary memory element 110 and secondary memory element 130 may each also be implemented as so-called "RS flip-flops" or as "latches." Furthermore, any other specific embodiments for primary and secondary memory elements 110 and 130 may be used, as long as comparable behavior is obtained with regard to particular state changes 212 (see FIG. 2) in primary memory element 110 and secondary memory element 130.

Evaluation device 120 includes in FIG. 1 a comparator which is implemented as an exclusive OR gate or as an adder in the present case. Output 134 always has value "1" if a signal at input 112 of primary memory element 110 and a signal at output 116 of primary memory element 110 have different bit values "0" or "1". Conversely, output 134 always has value "0" if the signal at input 112 of primary memory element 110 and the signal at output 116 of primary memory element 110 have identical bit values "0" or "1". Evaluation device 120 is thus configured to ascertain whether or not primary memory element 110 experiences a state change 212.

The function of secondary memory element 130 is as follows: If the bit value at inverting input 132 is "0," an instantaneously present bit value of "0" is changed to "1" or from "1" to "0" at output 136 (in the present case chronologically as a function of the above-described clock), this means Bit flipping takes place. Here, secondary memory element 130 is activated with the aid of evaluation device 120 in such a way that if primary memory element 110 experiences a state change 212, secondary memory element 130 does not carry out a state change 212, and if primary memory element 110 does not experience a state change 212, secondary memory element 130 carries out a state change 212. The behavior of primary memory element 110 is complementarily "mirrored," so to speak, by the behavior of secondary memory element 130.

In memory device 100, exactly one state change 212 therefore always takes place periodically, and for each clock step in the present case, i.e., there is never no state change 212 and never two state changes 212 at the same time. In this way, it is prevented or at least made very difficult for the bit value stored instantaneously in primary memory element 110 to be ascertained by measuring an operating current of memory device 100 or an operating current of an integrated circuit which includes memory device 100. This is in particular advantageous if memory device 100 is an element of a cryptographic device which is to be protected against so-called "side channel attacks."

(Optional) capacitor 138 causes a capacitive load at output 136 to be increased, this load corresponding at least approximately to the capacitive load (not illustrated) caused by second data line 118 at output 116 of primary memory element 110. This is in particular advantageous if memory device 100 is implemented with the aid of CMOS (complementary metal oxide semiconductor) cells, e.g., in an ASIC (application-specific integrated circuit) or an FPGA (field-programmable gate array).

In FIG. 1 only a primary memory element 110 having a storage capacity of one bit is illustrated for the sake of simplicity. Accordingly, memory device 100 or the integrated circuit may, however, also include multiple primary memory elements 110, at least some of primary memory elements 110 being connected to an associated evaluation device 120 and evaluation device 120 being connected to an associated secondary memory element 130. In this way, the present invention may advantageously be applied not only to single flip-flops, but also to almost any specific embodiments of digital memory devices 100, e.g., to parallel or serial shift register and to state machines and the like.

Figure 2:
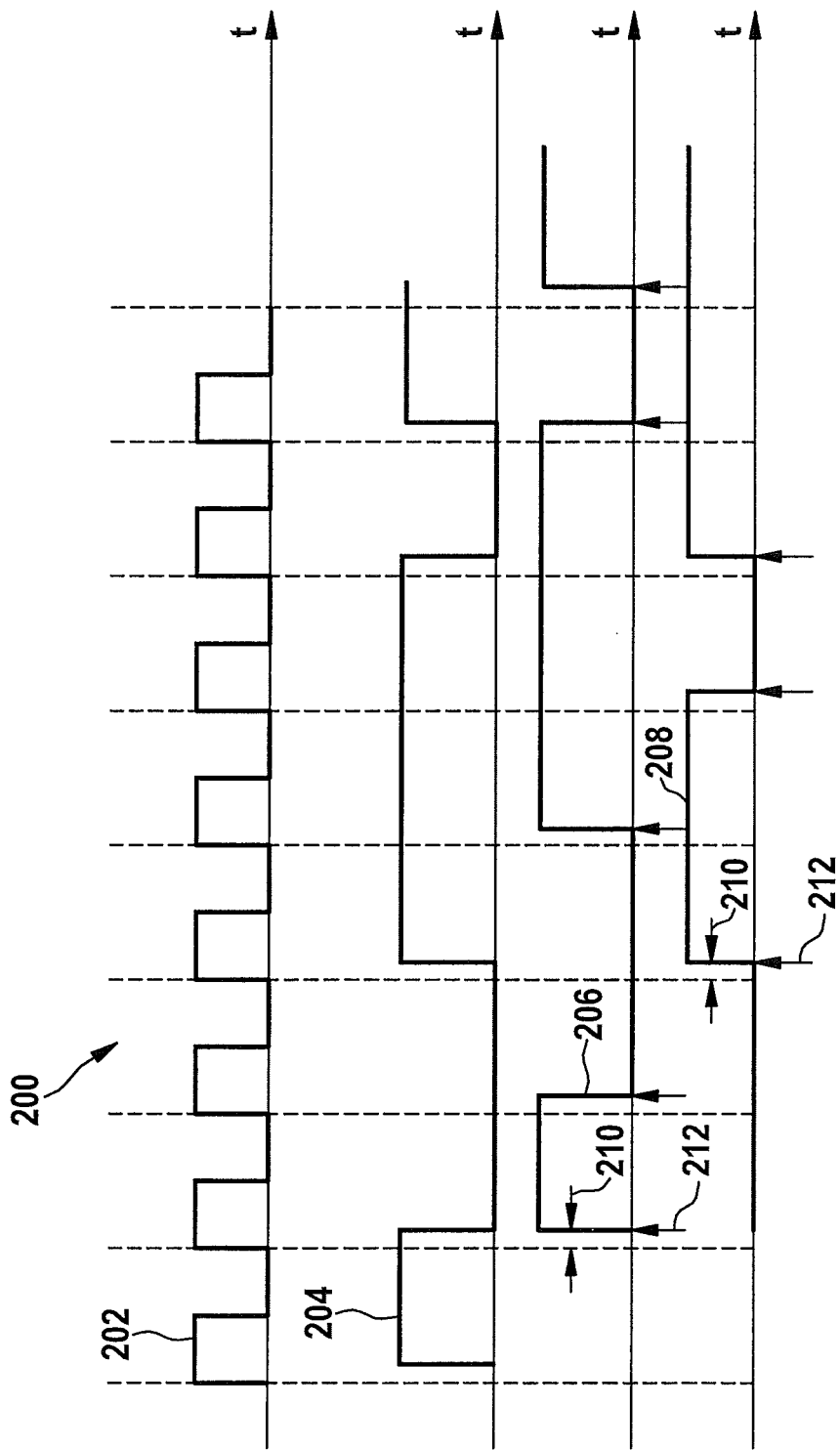
FIG. 2 shows a time diagram including signals at elements of FIG. 1.

FIG. 2 shows a time diagram 200 including signals at elements of FIG. 1. All four signals illustrated in FIG. 2 have the same time scale relation (time t) to each other. A signal which is uppermost (first) in FIG. 2 characterizes a clock signal 202 which clocks primary memory element 110 and secondary memory element 130. In the present case, the clocking takes place with the aid of the rising ("positive") clock-pulse edges of clock signal 202, which is illustrated in the drawing with the aid of vertical dashed lines (without reference numerals).

A second signal characterizes an input data signal 204 which is present at input 112 of primary memory element 110 as an example. A third signal characterizes an associated output data signal 206 which is present at output 116 of primary memory element 110. A fourth signal characterizes an associated bit flip signal 208 which is present at output 136 of secondary memory element 130.

Furthermore, FIG. 2 shows an internal delay 210 which characterizes a time period between the positive edge of clock signal 202 and resulting edges at output 116 of primary memory element 110 or output 136 of secondary memory element 130. In the present case, internal delays 210 for primary memory element 110 and secondary memory element 130 are at least approximately identical, so that a bit value may or might be changed at least approximately at the same time at outputs 116 or 136 with regard to a particular edge of clock signal 202.

In the present case, an identical internal delay 210 was also assumed for input data signal 204, this delay being predefined by a flip-flop (not illustrated) which is connected upstream from first data line 114 in the signal path. This identical internal delay 210 or the above-mentioned flip-flop are, however, not absolutely necessary for memory device 100 according to the present invention to be effective.

Clock signal 202, input data signal 204, and output data signal 206 characterize time curves of signals as already known per se from D flip-flops. In FIG. 2, the particular changes of the bit values or the associated edges are identified for output data signal 206 and Bit flip signal 208 with the aid of arrows, each of which thus characterizes a state change 212. It is apparent that if output data signal 206 changes its bit value in a particular clock step, Bit flip signal 208 does not change its bit value, and that if output data signal 206 does not change its bit value in a particular clock step, Bit flip signal 208 changes its bit value. This results in the effect according to the present invention which was already described in FIG. 1.

Figure 3:
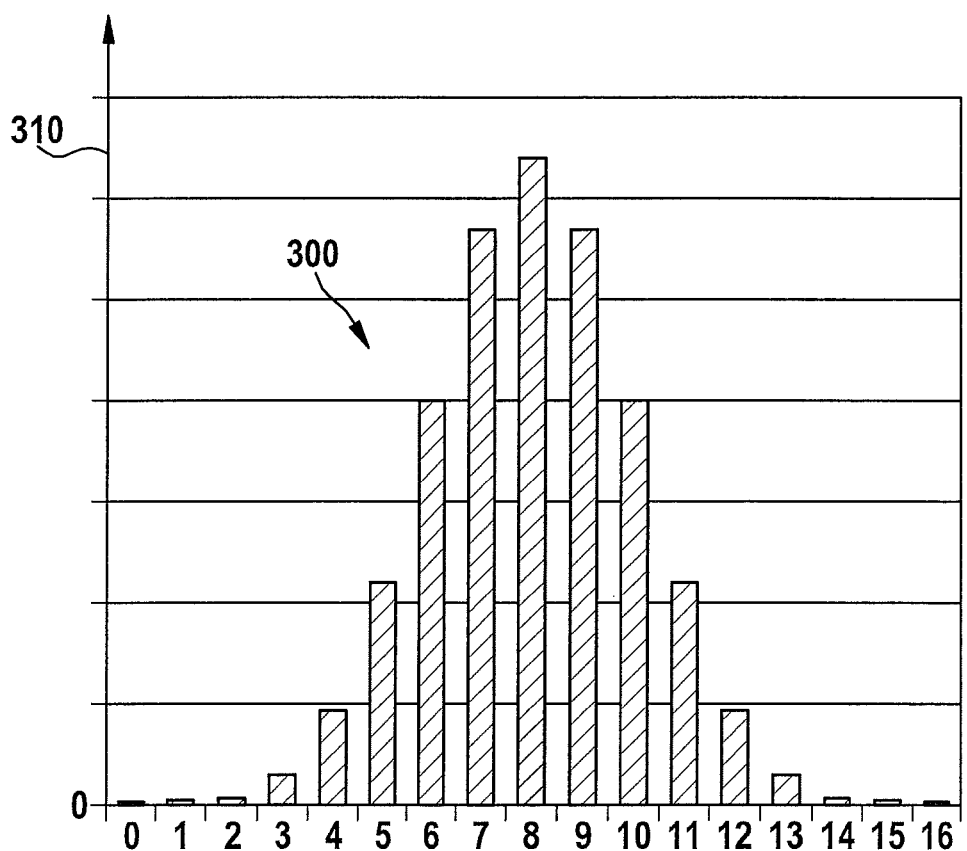
FIG. 3 shows a first diagram having a distribution of Hamming distances.

FIG. 3 shows a coordinate system having a normal distribution 300 of a Hamming distance between two statistically independent binary random numbers having a length of 16 bits. Accordingly, FIG. 3 likewise characterizes a normal distribution 300 of Bit flips in a 16-bit memory element which is implemented in parallel and which consecutively stores statistically independent binary random numbers which are 16 bits long. FIG. 3 thus characterizes memory device 100 in a 16-bit parallel specific embodiment without the utilization according to the present invention of evaluation device 120 and secondary memory element 130.

On the abscissa of the illustrated coordinate system, the number of the Bit flips is illustrated which is possible in each step, and on the ordinate, an associated (statistical) frequency 310 is illustrated. It is apparent that frequency 310 has a relative maximum in the case of half (8) of the 16 Bit flips maximally possible in one step. Accordingly, it is comparably easy to infer the instantaneous content of the 16-bit memory element which is characterized with the aid of FIG. 3 by measuring the operating current.

Figure 4:
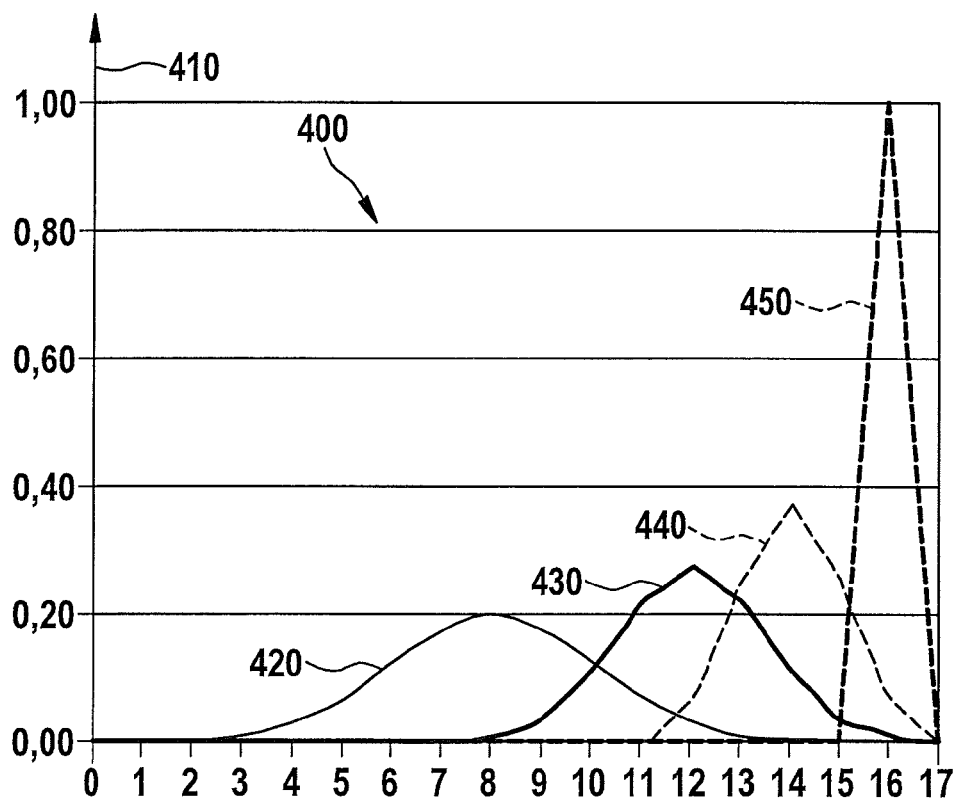
FIG. 4 shows a second diagram having a distribution of Hamming distances.

FIG. 4 shows a coordinate system having a distribution 400 of Bit flips in the 16-bit memory element, which is implemented in parallel, similarly to FIG. 3. In FIG. 4, memory device 100 is, however, operated in four different ways for the sake of demonstration, the "mirroring" according to the present invention being not used at all, used only partially, or used completely on a case-by-case basis. On the abscissa of the illustrated coordinate system, the number of the Bit flips is illustrated which is possible in each step, and on the ordinate, the particular normed associated (statistical) frequency 410 is illustrated.

"Mirroring" of primary memory element 110 is not carried out for a first distribution 420. Therefore, first distribution 420 corresponds to distribution 300 from FIG. 3.

Half (i.e., 8) of primary 16 memory elements 110 are mirrored according to the present invention for a second distribution 430. Thus, at least 8 Bit flips reliably take place in each clock step, and zero to 8 Bit flips are statistically distributed. Overall, the frequency maximum is 12.

Seventy-five percent (i.e., 12) of primary memory elements 110 are mirrored according to the present invention for a third distribution 440. Thus, at least 12 Bit flips reliably take place in each clock step, and zero to 4 Bit flips are statistically distributed. Overall, the frequency maximum is 14.

One hundred percent (i.e., 16) of primary memory elements 110 are mirrored according to the present invention for a fourth distribution 450. Thus, exactly 16 Bit flips always take place in each clock step. Accordingly, distribution 450 extends to a single point (16/1.00). Fourth distribution 450 therefore particularly effectively prevents a side channel attack.

Figure 5:
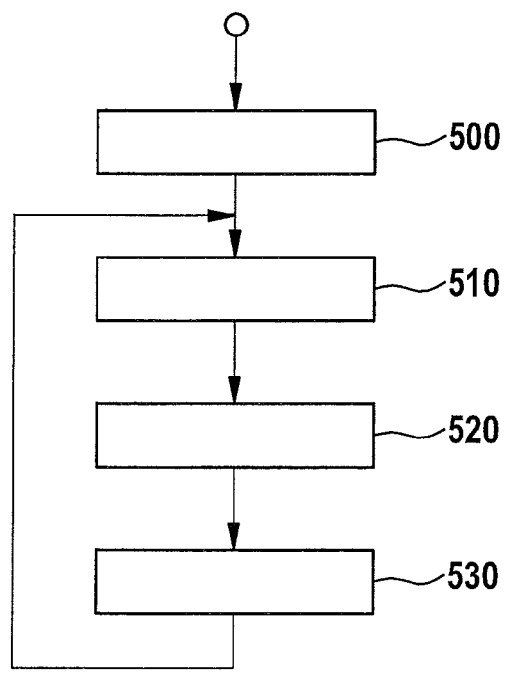
FIG. 5 shows a flow chart for a method for operating the memory device from FIG. 1.

FIG. 5 shows a flow chart for a method for operating memory device 100. In a starting block 500, the procedure illustrated in FIG. 5 starts. In a subsequent block 510, it is ascertained with the aid of evaluation device 120 whether or not primary memory'element 110 experiences a state change 212.

In another block 520, evaluating device 120 activates secondary memory element 130 in such a way that if primary memory element 110 experiences a state change 212, secondary memory element 130 does not carry out a state change 212, and that if primary memory element 110 does not experience a state change 212, secondary memory element 130 carries out a state change 212. In an end block 530, the procedure illustrated in FIG. 5 ends which may be continuously repeated starting at block 510 in each clock step which is relevant to memory device 100.

What is claimed is:

1. A memory device, comprising:
   a primary memory element; and
   an evaluation device to determine whether the primary memory element experiences a state change and to respond to the determination by controlling a secondary memory element according to a condition that (a) if the determination is that the primary memory element experiences the state change, the controlling includes setting the secondary memory element so that it responsively does not carry out a state change when the primary element experiences the state change, and (b) if the determination is that the primary memory element does not experience the state change, the controlling includes setting the secondary memory element to responsively carry out a state change when the primary memory element is, according to the determination, not experiencing the state change.

2. The memory device of claim 1, wherein the evaluation device includes a comparator, wherein an input and an associated output of the primary memory element are connected to the comparator, wherein an output of the comparator is connected to an input of the secondary memory element and the comparator is configured to control the secondary memory element so that the secondary memory element performs as follows: (a) changes a bit value at its output responsive to a recognition by the comparator of a parity of the bit values at the input and the output of the primary memory element, and (b) does not change the bit value at its output responsive to a recognition by the comparator of a disparity of the bit values at the input and the output of the primary memory element.

3. The memory device of claim 1, wherein the primary memory element and the secondary memory element are edge-clocked registers.

4. The memory device of claim 1, wherein the primary memory element includes at least one D flip-flop and the secondary memory element includes at least one T flip-flop.

5. The memory device of claim 1, wherein the primary memory element includes at least one D flip-flop and the secondary memory element includes at least one D flip-flop.

6. The memory device of claim 1, wherein the output of the secondary memory element is acted on by a capacitive load, so that the entire capacitive load at the output of the secondary memory element is at least approximately comparable to the entire capacitive load at the corresponding output of the primary memory element.

7. The memory device of claim 1, wherein the primary memory element, the evaluation device, and the secondary memory element are implemented in a joint integrated circuit, with the aid of CMOS (complementary metal oxide semiconductor) cells, or as an ASIC (application-specific integrated circuit), or as an FPGA (field-programmable gate array).

8. The memory device of claim 1, wherein the comparator includes at least one exclusive OR gate.

9. A memory register, comprising:
at least two memory devices;
wherein each of the memory devices includes:
a primary memory element; and
an evaluation device to determine whether the primary memory element experiences a state change and to respond to the determination by controlling a secondary memory element according to a condition that (a) if the determination is that the primary memory element experiences the state change, the controlling includes setting the secondary memory element so that it responsively does not carry out a state change when the primary element experiences the state change, and (b) the determination is that the primary memory element does not experience the state change, the controlling includes setting the secondary memory element to responsively carry out a state change when the primary memory element is, according to the determination, not experiencing the state change.

10. A method for operating a memory device including a primary memory element and a secondary memory element, the method comprising:
determining, with an evaluation device, whether the primary memory element experiences a state change; and
responding, by the evaluation device, to the determination by controlling the secondary memory element according to a condition that (a) if the determination is that the primary memory element experiences the state change, the controlling includes setting the secondary memory element so that it responsively does not carry out a state change when the primary element experiences the state change, and (b) if the determination is that the primary memory element does not experience the state change, the controlling includes setting the secondary memory element to responsively carry out a state change when the primary memory element is, according to the determination, not experiencing the state change.

11. The method of claim 10, wherein the method is used to make side channel attacks against a cryptographic device more difficult.

12. A computer readable medium having a computer program, which is executable by a processor, comprising:
program code for changing or adding a netlist or a source code for describing at least one memory device having a primary memory element;
wherein the computer program adds an associated evaluation device and an associated secondary memory element in the netlist or in the source code to a particular primary memory element, and wherein the program code, when executed by a processor, causes the processor to perform a method using the evaluation device, the method comprising the following:
determining whether the primary memory element experiences a state change; and
responding to the determination by controlling the secondary memory element according to a condition that (a) if the determination is that the primary memory element experiences the state change, the controlling includes setting the secondary memory element so that it responsively does not carry out a state change when the primary element experiences the state change, and (b) if the determination is that the primary memory element does not experience the state change, the controlling includes setting the secondary memory element to responsively carry out a state change when the primary memory element is, according to the determination, not experiencing the state change.

* * * * *